US012620498B2

(12) United States Patent
Gates et al.

(10) Patent No.: US 12,620,498 B2
(45) Date of Patent: May 5, 2026

(54) PLANAR COIL STELLARATOR

(71) Applicant: THE TRUSTEES OF PRINCETON UNIVERSITY, Princeton, NJ (US)

(72) Inventors: David Gates, Princeton, NJ (US); Caoxiang Zhu, Hefei (CN); Kenneth Hammond, Plainsboro, NJ (US)

(73) Assignee: THE TRUSTEES OF PRINCETON UNIVERSITY, Princeton, NJ (US)

( * ) Notice: Subject to any disclaimer, the term of this patent is extended or adjusted under 35 U.S.C. 154(b) by 37 days.

(21) Appl. No.: 18/395,510

(22) Filed: Dec. 23, 2023

(65) Prior Publication Data

US 2024/0177874 A1 May 30, 2024

Related U.S. Application Data

(63) Continuation of application No. 18/119,981, filed on Mar. 10, 2023, now Pat. No. 12,009,111.

(Continued)

(51) Int. Cl.
*G21B 1/05* (2006.01)
*H01F 6/06* (2006.01)

(52) U.S. Cl.
CPC ............... *G21B 1/055* (2013.01); *H01F 6/06* (2013.01)

(58) Field of Classification Search
None
See application file for complete search history.

(56) References Cited

U.S. PATENT DOCUMENTS 3,052,617 A * 9/1962 Post ......................... H05H 1/22 376/127
3,088,894 A * 5/1963 Koenig .................. G21B 1/055 376/150

(Continued)

FOREIGN PATENT DOCUMENTS

CN 112786273 B 9/2022
WO 2014039579 A2 3/2014

(Continued)

OTHER PUBLICATIONS

Murakami, S., A. Wakasa, H. Maaßberg, C. D. Beidler, H. Yamada, K. Y. Watanabe, and LHD Experimental Group. "Neoclassical Transport Optimization of LHD." Nuclear Fusion 42, No. 11 (Sep. 2002): L19. https://doi.org/10.1088/0029-5515/42/11/101.

(Continued)

*Primary Examiner* — Srinivas Sathiraju
(74) *Attorney, Agent, or Firm* — Charney IP Law LLC; Thomas M. Finetti

(57) ABSTRACT

Disclosed herein is a stellarator comprising two sets of coils, namely a set of encircling coils which encircle the plasma axis, and a set of shaping coils which do not encircle any other coil or the plasma. In some embodiments, the encircling coils include a structural element to maintain their shape under magnetic forces. In some embodiments, the shaping coils are mounted onto one or more structural elements which, together with the shaping coils, constitute a field shaping unit. Also disclosed is a controller which may modify the electrical current flowing in one or more subsets of the coils in order to achieve target plasma parameters. Also disclosed is a method of designing a set of shaping coils by discretizing a surface dipole or current potential distribution.

6 Claims, 12 Drawing Sheets

Related U.S. Application Data

(60) Provisional application No. 63/319,580, filed on Mar. 14, 2022.

(56) References Cited

U.S. PATENT DOCUMENTS

| | | | | |
|---|---|---|---|---|
| 3,607,627 | A * | 9/1971 | Furth | G21B 1/055 376/134 |
| 3,663,362 | A * | 5/1972 | Stix | H05H 1/12 376/127 |
| 3,801,438 | A * | 4/1974 | Ohkawa | H05H 1/12 376/133 |
| 4,007,392 | A * | 2/1977 | Valfells | H05H 1/10 313/154 |
| 4,236,964 | A * | 12/1980 | Bass | G21B 1/11 376/137 |
| 4,302,284 | A * | 11/1981 | Ohkawa | H05H 1/12 376/133 |
| 4,430,600 | A * | 2/1984 | Sheffield | H05H 1/12 376/133 |
| 4,663,109 | A * | 5/1987 | Reiman | G21B 1/055 376/142 |
| 4,735,765 | A | 4/1988 | Harris et al. | |
| 7,994,724 | B2 * | 8/2011 | Dine | H01J 37/32091 315/111.41 |
| 8,124,906 | B2 * | 2/2012 | Holber | H05H 1/46 219/121.48 |
| 8,134,440 | B2 * | 3/2012 | Beckenbach | H05H 13/04 315/501 |
| 8,324,814 | B2 * | 12/2012 | Pelletier | H01J 37/32623 118/723 MR |
| 8,383,525 | B2 * | 2/2013 | Raisanen | C23C 16/405 438/778 |
| 8,496,872 | B1 * | 7/2013 | Weires | C21D 1/667 266/252 |
| 8,590,485 | B2 * | 11/2013 | Biloiu | H01J 27/16 118/723 MR |
| 8,648,534 | B2 * | 2/2014 | You | H01J 37/3222 315/111.41 |
| 9,036,765 | B2 * | 5/2015 | Birnbach | G21B 1/23 376/105 |
| 9,767,925 | B2 * | 9/2017 | Cohen | G21B 1/052 |
| 9,947,511 | B2 * | 4/2018 | Ando | H01J 37/32522 |
| 9,967,963 | B2 * | 5/2018 | Zindler | H05H 1/04 |
| 10,639,492 | B2 * | 5/2020 | Cook | A61N 2/006 |
| 10,744,338 | B2 * | 8/2020 | Cook | H01F 7/064 |
| 10,811,144 | B2 * | 10/2020 | Laberge | G21B 1/057 |
| 11,646,139 | B2 | 5/2023 | Xu et al. | |
| 11,744,002 | B2 * | 8/2023 | Connell | H05H 1/11 376/140 |
| 12,009,111 | B2 * | 6/2024 | Gates | G21B 1/13 |
| 12,100,520 | B2 * | 9/2024 | Gates | G21B 1/13 |
| 2008/0285700 | A1 * | 11/2008 | Davis | G21B 1/23 376/137 |
| 2009/0073442 | A1 * | 3/2009 | Smith | G01J 4/04 356/367 |
| 2009/0231583 | A1 * | 9/2009 | Smith | G01J 4/04 356/367 |
| 2012/0014491 | A1 * | 1/2012 | Deeth | G21B 3/008 376/103 |
| 2015/0245461 | A1 * | 8/2015 | Belchenko | H05H 3/02 250/251 |
| 2015/0380114 | A1 * | 12/2015 | Park | H05H 1/11 376/144 |
| 2018/0207438 | A1 * | 7/2018 | Cook | H01F 7/064 |
| 2018/0226805 | A1 * | 8/2018 | Cao | H02J 3/32 |
| 2019/0009902 | A1 * | 1/2019 | Chan | H01F 6/02 |
| 2019/0009903 | A1 * | 1/2019 | Chan | B64C 30/00 |
| 2021/0029812 | A1 * | 1/2021 | Connell | H05H 1/54 |
| 2021/0210219 | A1 * | 7/2021 | Webb | G21G 7/00 |
| 2021/0233674 | A1 * | 7/2021 | You | B64G 1/417 |
| 2022/0208397 | A1 * | 6/2022 | Xu | H05H 1/12 |
| 2023/0290525 | A1 * | 9/2023 | Gates | G21B 1/13 |
| 2023/0317304 | A1 * | 10/2023 | Gates | H05H 3/06 376/191 |
| 2024/0096509 | A1 * | 3/2024 | Chandra | G21B 1/05 |
| 2024/0153651 | A1 * | 5/2024 | Gates | G21B 1/055 |
| 2024/0153662 | A1 * | 5/2024 | Harris | G21B 1/03 |
| 2024/0177874 | A1 * | 5/2024 | Gates | G21D 3/001 |
| 2024/0429839 | A1 * | 12/2024 | Clague | H02N 11/008 |

FOREIGN PATENT DOCUMENTS

| | | | | | |
|---|---|---|---|---|---|
| WO | WO-2023055022 | A1 * | 4/2023 | | H01J 37/3211 |
| WO | WO-2023178004 | A1 * | 9/2023 | | G21B 1/055 |

OTHER PUBLICATIONS

Bellan, Paul M. Fundamentals of Plasma Physics. Cambridge: Cambridge University Press, 2006. https://doi.org/10.1017/CBO9780511807183.

Wesson, John. Tokamaks. Third Edition. Oxford: Clarendon Press, 2004.

Chen, Francis F. Introduction to Plasma Physics and Controlled Fusion. Cham: Springer International Publishing, 2016. https://doi.org/10.1007/978-3-319-22309-4.

Richardson, A. S. "Nrl Plasma Formulary." Washington, DC 20375, USA: Naval Research Laboratory, 2019. https://www.nrl.navy.mil/ppd/content/nrl-plasma-formulary.

Freidberg, Jeffrey P. Ideal Magnetohydrodynamics. Plenum Publishing Company Limited, 1987.

Imbert-Gerard, Lise-Marie, Elizabeth J. Paul, and Adelle M. Wright. An Introduction to Stellarators: From Magnetic Fields to Symmetries and Optimization, 2019. https://arxiv.org/abs/1908.05360v2.

Helander, Per. "Theory of Plasma Confinement in Non-Axisymmetric Magnetic Fields." Reports on Progress in Physics 77, No. 8 (Jul. 2014): 087001. https://doi.org/10.1088/0034-4885/77/8/087001. lander.

Hudson, S. R., D. A. Monticello, A. H. Reiman, A. H. Boozer, D. J. Strickler, S. P. Hirshman, and M. C. Zarnstorff. "Eliminating Islands in High-Pressure Free-Boundary Stellarator Magnetohydrodynamic Equilibrium Solutions." Physical Review Letters 89, No. 27 (Dec. 20, 2002): 275003. https://doi.org/10.1103/PhysRevLett.89.275003.

Hastie, R. J., G. D. Hobbs, and J. B. Taylor. "Non-Adiabatic Behaviour of Particles in Inhomogeneous Magnetic Fields." Plasma Physics and Controlled Nuclear Fusion Research. Proceedings of the Third International Conference on Plasma Physics and Controlled Nuclear Fusion Research. vol. I, 1969. http://inis.iaea.org/Search/search.aspx?orig_q=RN:44064054.

Vaclavik, J., and K. Appert. "Theory of Plasma Heating by Low Frequency Waves: Magnetic Pumping and Alfvén Resonance Heating." Nuclear Fusion 31, No. 10 (Oct. 1991): 1945. https://doi.org/10.1088/0029-5515/31/10/013.

Nemov, V. V., S. V. Kasilov, W. Kernbichler, and M. F. Heyn. "Evaluation of 1/v Neoclassical Transport in Stellarators." Physics of Plasmas 6, No. 12 (Dec. 1, 1999): 4622-32. https://doi.org/10.1063/1.873749.

Grad, H. Containment in Cusped Plasma Systems. United States: N. p., 1961. Web.

Neilson, G. H., et al. Progress toward attractive stellarators. No. PPPL-4589. Princeton Plasma Physics Lab.(PPPL), Princeton, NJ (United States), 2011. (Year: 2011).

Zhu, Caoxiang, et al. "Designing stellarators using perpendicular permanent magnets." Nuclear Fusion 60.7 (2020): 076016. (Year: 2020).

Lehnert, B. 1975. "On Magnetically Confined Plasmas Used as Neutron Sources." Nuclear Instruments and Methods 129 (1): 27-30. https://doi.org/10.1016/0029-554X(75)90106-8.

Kolesnichenko, Ya I., and S. N. Reznik. 1976. "The D-D Nuclear Fusion Reaction in a Hybrid Reactor." Nuclear Fusion 16 (1): 97. https://doi.org/10.1088/0029-5515/16/1/010.

Hendel, H. W., and D. L. Jassby. 1990. "The Tokamak as a Neutron Source." Nuclear Science and Engineering 106 (2): 114-37. https://doi.org/10.13182/NSE90-A27465.

(56) References Cited

OTHER PUBLICATIONS

Dawson, J. M., H. P. Furth, and F. H. Tenney. 1971. "Production of Thermonuclear Power by Non-Maxwellian Ions in a Closed Magnetic Field Configuration." Physical Review Letters 26 (19): 1156-60. https://doi.org/10.1103/PhysRevLett.26.1156.
Jassby, D. L. 1977. "Neutral-Beam-Driven Tokamak Fusion Reactors." Nuclear Fusion 17 (2): 309. https://doi.org/10.1088/0029-5515/17/2/015.
Price, Robert E., Geoffrey W. Shuy, and James T. Woo. 1986. "Deuterium Driven D-T Fusion Reactor Test Facility." Fusion Technology 10 (3P2B): 1412-17. https://doi.org/10.13182/FST86-A24926.
Forest, Cary, Jay Anderson, Dan Brunner, Jan Egedal, Ken Fowler, Alexander Ivanov, Bob Harvey, et al. 2020. "The WHAM (Wisconsin HTS Axisymmetric Mirror) Neutron Source and End Plug On a Low Cost Path to BEAT: Break Even Axisymmetric Tandem." PPPL Colloquium, Princeton Plasma Physics Laboratory, Princeton, NJ, USA, Oct. 14. https://pppl-intranet.princeton.edu/event/pppl-colloquium-cary-forest-university-of-wisconsin-madison-the-wisconsin-axisymmetric-mirror.
International Search Report for PCT/US2023/064025, filed on Mar. 9, 2023.
Heikkinen, D. W. 1988. "RTNS-II (Rotating Target Neutron Source II) Operational Summary." UCRL-98946; CONF-881151-13. Lawrence Livermore National Lab., CA (USA). https://www.osti.gov/biblio/6816875.
Hendel, H. W., A. C. England, D. L. Jassby, A. A. Mirin, and E. B. Nieschmidt. 1986. "Fusion-Neutron Production in the TFTR with Deuterium Neutral-Beam Injection." Journal of Fusion Energy 5 (3): 231-44. https://doi.org/10.1007/BF01050616.
Seki, Ryosuke, Kunihiro Ogawa, Mitsutaka Isobe, Masayuki Yokoyama, Sadayoshi Murakami, Hideo Nuga, Shuji Kamio, Yutaka Fujiwara, Masaki Osakabe, and LHD Experiment Group. 2019. "Evaluation of Neutron Emission Rate with FIT3D-DD Code in Large Helical Device." Plasma and Fusion Research 14: 3402126-3402126. https://doi.org/10.1585/pfr.14.3402126.
Hemsworth, R. S., D. Boilson, P. Blatchford, M. Dalla Palma, G. Chitarin, H. P. L. de Esch, F. Geli, et al. 2017. "Overview of the Design of the ITER Heating Neutral Beam Injectors." New Journal of Physics 19 (2): 025005. https://doi.org/10.1088/1367-2630/19/2/025005.
Helander, Per. 2014. "Theory of Plasma Confinement in Non-Axisymmetric Magnetic Fields." Reports on Progress in Physics 77 (8): 087001. https://doi.org/10.1088/0034-4885/77/8/087001.
Dinklage, A., C. D. Beidler, P. Helander, G. Fuchert, H. Maaßberg, K. Rahbarnia, T. Sunn Pedersen, et al. 2018. "Magnetic Configuration Effects on the Wendelstein 7-X Stellarator." Nature Physics 14 (8): 855-60. https://doi.org/10.1038/s41567-018-0141-9.
Canik, J. M., D. T. Anderson, F. S. B. Anderson, K. M. Likin, J. N. Talmadge, and K. Zhai. 2007. "Experimental Demonstration of Improved Neoclassical Transport with Quasihelical Symmetry." Physical Review Letters 98 (8): 085002. https://doi.org/10.1103/PhysRevLett.98.085002.
Landreman, Matt, and Elizabeth Paul. 2022. "Magnetic Fields with Precise Quasisymmetry for Plasma Confinement." Physical Review Letters 128 (3): 035001. https://doi.org/10.1103/PhysRevLett.128.035001.
Williamson, D., A. Brooks, T. Brown, M. Cole, H .- M. Fan, P. Goranson, M. Hechler, P. Heitzenroeder, B. Nelson, and W.T. Reiersen. 1999. "Design Description of the Saddle Coils for the National Compact Stellarator Experiment (NCSX)." In 18th IEEE/NPSS Symposium on Fusion Engineering. Symposium Proceedings (Cat. No.99CH37050), 441-44. https://doi.org/10.1109/FUSION.1999.849874.
Yoshimura, Y., S. Kubo, T. Shimozuma, H. Igami, T. Mutoh, Y. Nakamura, K. Ohkubo, et al. 2005. "Achievement of One Hour Discharge with ECH on LHD." Journal of Physics: Conference Series 25 (1): 189. https://doi.org/10.1088/1742-6596/25/1/024.
Beidler, Craig, Günter Grieger, Franz Herrnegger, Ewald Harmeyer, Johann Kisslinger, Wolf Lotz, Henning Maassberg, et al. 1990. "Physics and Engineering Design for Wendelstein VII-X." Fusion Technology 17 (1): 148-68. https://doi.org/10.13182/FST90-A29178.
Neilson, GH, A Brooks, D Johnson, H Kugel, R Majeski, W Reierson, M Zarnstorff, et al. 2000. "NCSX Machine Configuration Design Progress." In Proceedings of the 42nd Annual Meeting of the APS Division of Plasma Physics Combined with the 10th International Congress on Plasma Physics October. Quebec City, Canada: American Physical Society. https://pdfs.semanticscholar.org/ae61/55495dc12fc564d69b0ae9f3e2c444edc5e5.pdf.
Rummel, Thomas, Konrad Risze, Johann Kiszlinger, Matthias Koppen, Frank Fullenbach, Hutch Neilson, Tom Brown, and Subrahmanya Ramakrishnan. 2012. "The Trim Coils for the Wendelstein 7-X Magnet System." IEEE Transactions on Applied Superconductivity 22 (3): 4201704-4201704. https://doi.org/10.1109/TASC.2011.2182027.
Todd, T. N. 1990. "Ultra-Simple Stellarators." Plasma Physics and Controlled Fusion 32 (6): 459. https://doi.org/10.1088/0741-3335/32/6/004.
Pedersen, Thomas Sunn, Allen H. Boozer, Jason Paul Kremer, Remi G. Lefrancois, Wayne T. Reiersen, Fred Dahlgren, and Neil Pomphrey. 2004. "The Columbia Nonneutral Torus: A New Experiment to Confine Nonneutral and Positron-Electron Plasmas in a Stellarator." Fusion Science and Technology 46 (1): 200-208. https://doi.org/10.13182/FST04-A556.
Ku, Long-Poe, and Allen H. Boozer. 2009. "Nonaxisymmetric Shaping of Tokamaks Preserving Quasiaxisymmetry." Physics of Plasmas 16 (8): 082506. https://doi.org/10.1063/1.3207010.
Merkel, p. 1987. "Solution of Stellarator Boundary Value Problems with External Currents." Nuclear Fusion 27 (5): 867. https://doi.org/10.1088/0029-5515/27/5/018.
Landreman, Matt. 2017. "An Improved Current Potential Method for Fast Computation of Stellarator Coil Shapes." Nuclear Fusion 57 (4): 046003. https://doi.org/10.1088/1741-4326/aa57d4.
Hammond, K. C., C. Zhu, T. Brown, K. Corrigan, D. A. Gates, and M. Sibilia. 2020. "Geometric Concepts for Stellarator Permanent Magnet Arrays." Nuclear Fusion 60 (10): 106010. https://doi.org/10.1088/1741-4326/aba8dc.
Zhu, Caoxiang, Michael Zarnstorff, David Gates, and Arthur Brooks. 2020. "Designing Stellarators Using Perpendicular Permanent Magnets." Nuclear Fusion 60 (7): 076016. https://doi.org/10.1088/1741-4326/ab9006.
Sahinidis, Nikolaos V. 2019. "Mixed-Integer Nonlinear Programming 2018." Optimization and Engineering 20 (2): 301-6. https://doi.org/10.1007/s11081-019-09438-1.
Guodong Yu Zhichen Feng Peiyou Jiang Neil Pomphrey Matt Landreman Guoyong Fu: "A neoclassically optimized compact stellarator with four planar coils", ARXIV.ORG, Cornell University Library, 201 Olin Library Cornell University Ithaca, NY 14853, Jun. 10, 2021 (Jun. 10, 2021).
Takeiri Y.: "Prospect Toward Steady-State 1-64 Helical Fusion Reactor Based on Progress of LHD Project Entering the Deuterium Experiment Phase", IEEE Transactions On Plasma Science., vol. 46, No. 5, Oct. 12, 2017 (Oct. 12, 2017) , pp. 1141-1148.
Isobe M et al: "Fusion neutron production with deuterium neutral beam injection and enhancement of energetic-particle physics study in the large helical device", Nuclear Fusion, Publishing Section. Vienna, At, vol. 58, No. 8, Jun. 29, 2018 (Jun. 29, 2018).
Zarnstorff M C et al: "Simpler optimized stellarators using permanent magnets", Nuclear Fusion., Jun. 25, 2021 (Jun. 25, 2021) , pp. 1-4.
Zarnstorf M C: "Progress on the Stellarator Path to Fusion Power", Fusion Power Associates Meeting, Dec. 16, 2021 (Dec. 16, 2021) , pp. 1-15,.
Caoxiang Zhu et al: "Topology 18-54 optimization of permanent magnet s for stellarators", Nuclear Fusion, Publishing Section. Vienna, AT, vol. 60, No. 10, Aug. 21, 2020 (Aug. 21, 2020), p. 106002.
Partial Search Report for PCT Application No. PCT/US2023/063949, filed on Mar. 8, 2023.

* cited by examiner

PLANAR COIL STELLARATOR

CROSS-REFERENCE TO RELATED APPLICATIONS

The present disclosure is a continuation of U.S. patent application Ser. No. 18/119,981 filed on Mar. 10, 2023, which application claims the benefit of the filing date of U.S. Provisional Patent Application No. 63/319,580 filed on Mar. 14, 2022, the disclosures of which are hereby incorporated by reference herein in their entireties.

STATEMENT REGARDING FEDERALLY SPONSORED RESEARCH

This invention was made with government support under Grant Nos. DE-AC02-09CH11466 awarded by the Department of Energy and DE-AR0001264 awarded by the Department of Energy/Advanced Research Projects Agency (ARPA-E). The government has certain rights in the invention.

FIELD OF THE DISCLOSURE

The present disclosure is directed to stellarators and, in particular, stellarators incorporating one or more planar coils. The stellarators incorporating the one or more planar coils are adapted to confine a plasma, such as to confine a plasma within a void defined by one or more field shaping units.

BACKGROUND OF THE DISCLOSURE

Fusion is a process which can be harnessed to release the nuclear energy in abundant fuels, without emissions of greenhouse gases and with significantly lower and shorter-lived radioactive waste than conventional fission nuclear reactors. Fusion fuels fuse only at extremely high temperature, at which all materials are in the plasma state.

Magnetic fusion devices aim to confine a fusing plasma using magnetic fields. The two leading magnetic fusion approaches are the tokamak and the stellarator, both of which utilize a magnetic field which has the topology of a torus.

Stellarators have the advantage over tokamaks of operating in steady state and requiring no additional electrical current to be driven within the plasma itself. Prior stellarator designs have included non-planar electromagnetic coils which have a complex, 3D curvature. These electromagnetic coils are difficult to design, fabricate, integrate, and maintain. Some stellarator designs include electromagnetic coils which link other electromagnetic coils, akin to the links of a chain. These electromagnetic coils cannot be fabricated separately and then assembled; they must be fabricated together, which further increases the difficulty of their fabrication, integration, and maintenance.

One example of a stellarator employing complex electromagnetic coils is the Large Helical Device (LHD) experiment operated by the Japanese National Institute for Fusion Science (Yoshimura, Y., et al. 2005. Journal of Physics: Conference Series 25 (1): 189). These electromagnetic coils are helical coils, which are non-planar and interlock the plasma and the other helical coils. These electromagnetic coils must be wound with electrical wire on-site. Stellarators employing such electromagnetic coils are termed Torsatrons or Heliotrons.

Another example of a stellarator employing complex electromagnetic coils is the Wendelstein 7-X (W7-X) experiment operated by the German Max Planck Institute for Plasma Physics (Beidler, Craig, et al. 1990. Fusion Technology 17 (1): 148-68). With reference to FIG. 1A, W7-X uses a combination of external planar coils 101 and modular coils 102. The external planar coils are planar 101, interlock the plasma, and do not interlock any other coils. The modular coils 102 are non-planar, interlock the plasma, and do not interlock any other coils. Stellarators employing this kind of coils can be termed Heliases or, more generally, modular coil stellarators.

The National Compact Stellarator Experiment (NCSX) was a proposed experiment that was canceled during its construction. A few different designs were proposed (Neilson, G H, et al. 2000. In Proceedings of the 42nd Annual Meeting of the APS Division of Plasma Physics Québec City, Canada). A proposed "saddle coil design" which utilized (i) Toroidal Field (TF) coils, which are planar coils that interlock the plasma, but which do not interlock any other coils; and (ii) saddle coils, which are non-planar coils that do not interlock the plasma, but do not interlock any other coils. An alternative design, referred to as the "optimized background coils and conformal coils design" utilized (i) background coils which are planar, interlock the plasma, and that interlock other background coils; and (ii) saddle coils, which are planar, do not interlock the plasma, and which do not interlock any other coils.

Several experimental designs, such as W7-X and NCSX, incorporate planar trim coils (Rummel, Thomas, et al. 2012. IEEE Transactions on Applied Superconductivity 22 (3): 4201704-4201704). Planar trim coils are planar, do not interlock the plasma, and do not interlock with any other coils. Planar trim coils are part of a control system rather than a magnetic field generation system. As such, their purpose is to correct a magnetic field which is off nominal in some way (e.g., due to some imprecision in construction or due to plasma behavior). At the nominal operating point, planar trim coils are designed to be inactive. FIG. 1A illustrates the planar trim coils 103 as utilized in the W7-X design. Notably, the planar trim coils 103 positioned on the "outboard side" of the stellarator, away from the center of the device; and also positioned outside to the external planar coils. It is also notable that the planar trim coils 103 are comprised of copper; and are not comprised of a superconducting material like the external planar coils 102 and the modular coils 102 utilized in the W7-X design. It is also notable that the planar trim coils 103 are much larger than the minor radius of the plasma, and almost the size of the major radius of the plasma.

An article by T. N. Todd in 1990 (Todd, T. N. 1990 Plasma Physics and Controlled Fusion 32 (6): 459) and an experiment built at Columbia University in 2004, called the Columbia Non-neutral Torus (CNT, Pedersen, Thomas Sunn et al. 2004. Fusion Science and Technology 46 (1): 200-208) describe stellarators which use planar coils. The Todd 1990 article describes a 2-coil stellarator, both of which are planar and interlock the plasma. With reference to FIG. 1B, the CNT uses Inter-Locking (IL) 104 coils and Poloidal Field (PF) 105 coils. The IL coils are planar and interlock each other and the plasma. The PF coils are planar and do not interlock the plasma, themselves, or any other coils.

In an article authored by L. Ku and A. H. Boozer in 2009 (Ku, Long-Poe, and Allen H. Boozer. 2009. Physics of Plasmas 16 (8): 082506) describes a stellarator which uses TF coils and window pane coils. The TF coils are planar, interlock the plasma, and do not interlock any other coils.

The window pane coils are depicted by Ku as being non-planar. Ku describes that they do not interlock the plasma; and that they do not interlock any other coils. Furthermore, Ku refers to the design as "difficult to implement" and qualifies the concept as an "existence proof," indicating that they did not believe the design to be practical.

Several items in the prior art use toroidal field (TF) coils. See the saddle coil design of NCSX in Neilson et al. 2000 and the design in Ku and Boozer 2009. An important aspect of TF coils is that, while they are planar and encircle the plasma, their location and orientation exhibit N-fold rotational symmetry. Specifically, if the TF coil system consists of N coils, then rotating the coil system by 360°/N produces the same set of TF coils. This was done in order to approximate a simple, axisymmetric magnetic field, like a tokamak.

From the foregoing, it is apparent that stellarators designed to-date have incredibly complex three-dimensional design, which leads to increased costs and to difficulty controlling the distribution of the 3D magnetic field. It would be desirable to develop a stellarator having a less complex design and one which enables greater control of the generated magnetic field.

BRIEF SUMMARY OF THE DISCLOSURE

The present disclosure is directed to an improved stellarator design which has a simpler, less complex structure as compared with stellarators developed to-date. As compared with prior art stellarators, in some embodiments the stellarators of the present disclosure do not require non-planar coils. Rather, in some embodiments, the stellarators of the present disclosure utilize a plurality of planar encircling coils and a plurality of planar shaping coils. As described herein, in some embodiments the planar encircling coils encircle the plasma axis, but not any other planar encircling coil or any planar shaping coil. Moreover, in some embodiments the planar shaping coils do not encircle the plasma axis; nor do they encircle any other planar shaping coil or any planar encircling coil.

In view of the foregoing, a first aspect of the present disclosure is a stellarator comprising: (a) a field-shaping coil system including one or more field shaping units which define a void adapted to confine a plasma, wherein each field shaping unit comprises (i) one or more structural mounting elements; and (ii) one or more planar shaping coils disposed on a surface of the one or more structural mounting elements; and (b) a plurality of planar encircling coils which encircle the field-shaping coil system. Since the field-shaping coil system defines a void which confines the plasma, and since the planar encircling coils encircle the field-shaping coil system, the planar encircling coils therefore encircle the plasma confined within the void. In some embodiments, the stellarator does not include any non-planar coils.

In some embodiments, the stellarator further comprises one or more controllers. In some embodiments, the stellarator further comprises one or more control coils and/or one or more saddle coils. In some embodiments, the one or more control coils and/or the one or more saddles coils are communicatively coupled to a controller.

In some embodiments, each of the one or more of planar shaping coils are superconducting coils. In some embodiments, each of the plurality of planar encircling coils are superconducting coils. In some embodiments, both the plurality of planar shaping coils and the plurality of planar encircling coils are superconducting coils.

In some embodiments, the stellarator includes between about 3 and about 100 planar encircling coils. In some embodiments, the stellarator includes between about 5 and about 50 planar encircling coils. In some embodiments, the stellarator comprises at least four planar encircling coils. In some embodiments, the plurality of planar encircling coils are comprised of one or more superconducting materials. In some embodiments, the plurality of planar encircling coils do not interlock with each other. In some embodiments, the plurality of planar encircling coils do not interlock with each other and do not interlock with any of the one or more shaping coils.

In some embodiments, the stellarator comprises at least 4 field shaping units. In some embodiments, each of the one or more field shaping units comprises one structural mounting element. In some embodiments, the one structural mounting element is wedge shaped or substantially wedge shaped. In some embodiments, each of the one or more field shaping units comprises two or more structural mounting elements.

In some embodiments, the one or more planar shaping coils do not interlock with each other. In some embodiments, the one or more planar shaping coils do not interlock with each other and do not interlock with any of the plurality of planar encircling coils.

In some embodiments, each of the one or more field shaping units comprises between about 5 and about 150 shaping coils. In some embodiments, each of the one or more field shaping units comprises between about 5 and about 100 shaping coils. In some embodiments, each of the one or more field shaping units comprises between about 5 and about 50 shaping coils. In some embodiments, each of the one or more field shaping units comprises between about 5 and about 25 shaping coils. In some embodiments, the surface of the one or more structural mounting elements faces the void.

In some embodiments, a shape of each planar shaping coil of the one or more planar shaping coils is substantially rectangular, substantially rectangular with rounded corners, or substantially circular. In some embodiments, a shape of each planar shaping coil of the one or more planar shaping coils is rectangular, rectangular with rounded corners, or circular.

A second aspect of the present disclosure is a stellarator comprising: (a) a field-shaping coil system including one or more field shaping units which define a void adapted to confine a plasma, wherein each field shaping unit comprises (i) one or more structural mounting elements; and (ii) one or more shaping coils disposed on a surface of the one or more structural mounting elements; and (b) a plurality of encircling coils which encircle the plasma and the field-shaping coil system, wherein the one or more shaping coils and the plurality of encircling coils are comprised of one or more superconducting materials. In some embodiments, each of the one or more shaping coils disposed on the surface of the one or more structural mounting elements does not encircle the plasma. In some embodiments, the one or more shaping coils are planar. In some embodiments, each encircling coil of the plurality of encircling coils are planar.

In some embodiments, a shape of each of the one or more shaping coils is substantially rectangular, substantially rectangular with rounded corners, or substantially circular. In some embodiments, a shape of each of the one or more shaping coils is rectangular, rectangular with rounded corners, or circular. In In some embodiments, each of the one or more field shaping units comprises between about 5 and about 100 shaping coils. In some embodiments, each of the one or more field shaping units comprises between about 5 and about 50 shaping coils. In some embodiments, the one or more planar shaping coils do not interlock with each other. In some embodiments, the one or more planar shaping coils do not interlock with each other and do not interlock with any one of the encircling coils of the plurality of encircling coils.

In some embodiments, each of the one or more field shaping units comprises one structural mounting element. In some embodiments, the one structural mounting element is wedge shaped or substantially wedge shaped. In some embodiments, each of the one or more field shaping units comprises two or more structural mounting elements.

In some embodiments, the plurality of encircling coils encircle the plasma confined within the void. In some embodiments, the stellarator includes between about 3 and about 100 encircling coils. In some embodiments, the stellarator comprises at least four encircling coils.

In some embodiments, the plurality of planar encircling coils do not interlock with each other. In some embodiments, the plurality of planar encircling coils do not interlock with each other or with any of the one or more shaping coils.

In some embodiments, the stellarator further comprises one or more control coils and/or one or more saddle coils. In some embodiments, the one or more control coils and/or the one or more saddles coils are communicatively coupled to a controller.

A third aspect of the present disclosure is a stellarator comprising: (a) a void adapted to confine a plasma having a plasma axis; (b) a plurality of planar shaping coils, wherein an array comprising the plurality of planar shaping coils encircles the plasma axis, but where any individual planar shaping coil of the plurality of planar shaping coils does not encircle the plasma axis; and (c) a plurality of planar encircling coils, wherein each individual planar encircling coil of the plurality of encircling coils encircles the plasma axis. In some embodiments, each of the plurality of planar shaping coils are superconducting coils. In some embodiments, each of the plurality of planar encircling coils are superconducting coils. In some embodiments, both the plurality of planar shaping coils and the plurality of planar encircling coils are superconducting coils. In some embodiments, the plasma is a deuterium plasma.

In some embodiments, the plurality of planar shaping coils do not interlock one another. In some embodiments, the plurality of planar shaping coils do not interlock with one another and do not interlock with any one of the plurality of encircling coils.

In some embodiments, plurality of planar encircling coils do not interlock one another. In some embodiments, the plurality of planar encircling coils do not interlock with one another and do not interlock with any one of the plurality of planar shaping coils.

In some embodiments, the stellarator further comprises one or more control coils and/or one or more saddle coils. In some embodiments, the one or more control coils and/or the one or more saddle coils are not superconducting coils.

In some embodiments, a shape of each planar shaping coil of the one or more planar shaping coils is substantially rectangular, substantially rectangular with rounded corners, or substantially circular. In some embodiments, a shape of each planar shaping coil of the one or more planar shaping coils is rectangular, rectangular with rounded corners, or circular.

In some embodiments, the stellarator comprises between about 10 and about 10,000 shaping coils. In some embodiments, the stellarator comprises between about 100 and about 2,000 shaping coils. In some embodiments, the stellarator comprises between about 100 and about 1,000 shaping coils. In some embodiments, the stellarator includes between about 3 and about 100 planar encircling coils. In some embodiments, the stellarator includes between about 5 and about 50 planar encircling coils. In some embodiments, the stellarator comprises at least four planar encircling coils.

A fourth aspect of the present disclosure is a stellarator comprising: (a) a void adapted to confine a plasma, wherein the void comprises at least two faces; (b) at least two planar shaping coils, wherein a first of the at least two planar shaping coils is proximal to a first of the at least two faces but does not encircle the void, and wherein a second of the at least two planar shaping coils is proximal to a second of the at least two faces but does not encircle the void; and (c) a plurality of planar encircling coils, wherein each individual planar encircling coil of the plurality of encircling coils encircles the plasma axis. In some embodiments, wherein the at least two faces are on opposite sides of the confined plasma.

In some embodiments, the at least two faces are on opposite sides of the confined plasma.

In some embodiments, the at least two planar shaping coils do not interlock one another. In some embodiments, the at least two planar shaping coils do not interlock one another and do not interlock any one of the plurality of encircling coils.

In some embodiments, plurality of planar encircling coils do not interlock one another. In some embodiments, the plurality of planar encircling coils do not interlock one another and do not interlock any one of the at least two planar shaping coils.

In some embodiments, the at least two planar shaping coils are comprised of one or more superconducting materials. In some embodiments, the plurality of encircling coils are comprised of one or more superconducting materials. In some embodiments, the plurality of encircling coils and the at least two planar shaping coils are both comprised of one or more superconducting materials.

In some embodiments, the stellarator further comprises one or more control coils and/or one or more saddle coils. In some embodiments, the one or more control coils and/or the one or more saddle coils are not superconducting coils.

In some embodiments, shape of each planar shaping coil of the at least two planar shaping coils is substantially rectangular, substantially rectangular with rounded corners, or substantially circular. In some embodiments, a shape of each planar shaping coil of the one or more planar shaping coils is rectangular, rectangular with rounded corners, or circular. In some embodiments, the stellarator comprises between about 10 and about 10,000 shaping coils. In some embodiments, the stellarator comprises between about 100 and about 2,000 shaping coils. In some embodiments, the stellarator comprises between about 100 and about 1,000 shaping coils. In some embodiments, the stellarator includes between about 3 and about 100 planar encircling coils. In some embodiments, the stellarator comprises at least four planar encircling coils.

A fifth aspect of the present disclosure is a stellarator comprising: (a) a plurality of structural supports; (b) one or more field shaping units operably connected to the plurality of structural supports, each field shaping unit comprising one or more planar, surface-mounted shaping coils; and (c) a plurality of planar encircling coils; wherein the plurality of structural supports, the one or more field shaping units, and the plurality of encircling coils collectively define a void adapted for confining plasma therein.

In some embodiments, the stellarator comprises between about 10 and about 10,000 planar, surface-mounted shaping coils. In some embodiments, the stellarator comprises between about 100 and about 2,000 planar, surface-mounted shaping coils. In some embodiments, the stellarator comprises between about 100 and about 1,000 shaping planar, surface-mounted coils. In some embodiments, the stellarator includes between about 3 and about 100 planar encircling coils. In some embodiments, the stellarator includes between about 5 and about 50 planar encircling coils. In some embodiments, the stellarator comprises at least four planar encircling coils. In some embodiments, the plurality of planar encircling coils are comprised of one or more superconducting materials. In some embodiments, the plurality of planar encircling coils do not interlock with each other. In some embodiments, the plurality of planar encircling coils do not interlock with each other or with any of the planar, surface-mounted shaping coils.

In some embodiments, the stellarator comprises at least 4 field shaping units. In some embodiments, each of the one or more planar, surface-mounted shaping coils do not interlock with each other. In some embodiments, the stellarator comprises at least 4 field shaping units. In some embodiments, each of the one or more planar, surface-mounted shaping coils do not interlock with each other or with any of the encircling coils. In some embodiments, a shape of each planar shaping coil of the one or more planar, surface-mounted shaping coils is substantially rectangular, substantially rectangular with rounded corners, or substantially circular. In some embodiments, a shape of each planar shaping coil of the one or more planar, surface-mounted shaping coils is rectangular, rectangular with rounded corners, or circular.

In some embodiments, each of the one or more field shaping units comprises between about 5 and about 100 planar, surface-mounted shaping coils. In some embodiments, each of the one or more field shaping units comprises between about 5 and about 50 planar, surface-mounted shaping coils. In some embodiments, the one or more planar, surface-mounted shaping coils are comprised of a superconducting material.

In some embodiments, the stellarator further comprises one or more controllers.

In some embodiments, the stellarator further comprises one or more control coils and/or one or more saddle coils. In some embodiments, the one or more control coils and/or the one or more saddles coils are communicatively coupled to a controller. In some embodiments, each of the one or more shaping coils do not individually encircle the plasma.

BRIEF DESCRIPTION OF THE FIGURES

For a general understanding of the features of the disclosure, reference is made to the drawings. In the drawings, like reference numerals have been used throughout to identify identical elements.

FIG. 2A illustrates a plurality of planar encircling coils encircling the field-shaping coil system and hence the plasma.

DETAILED DESCRIPTION

Figure 1A:
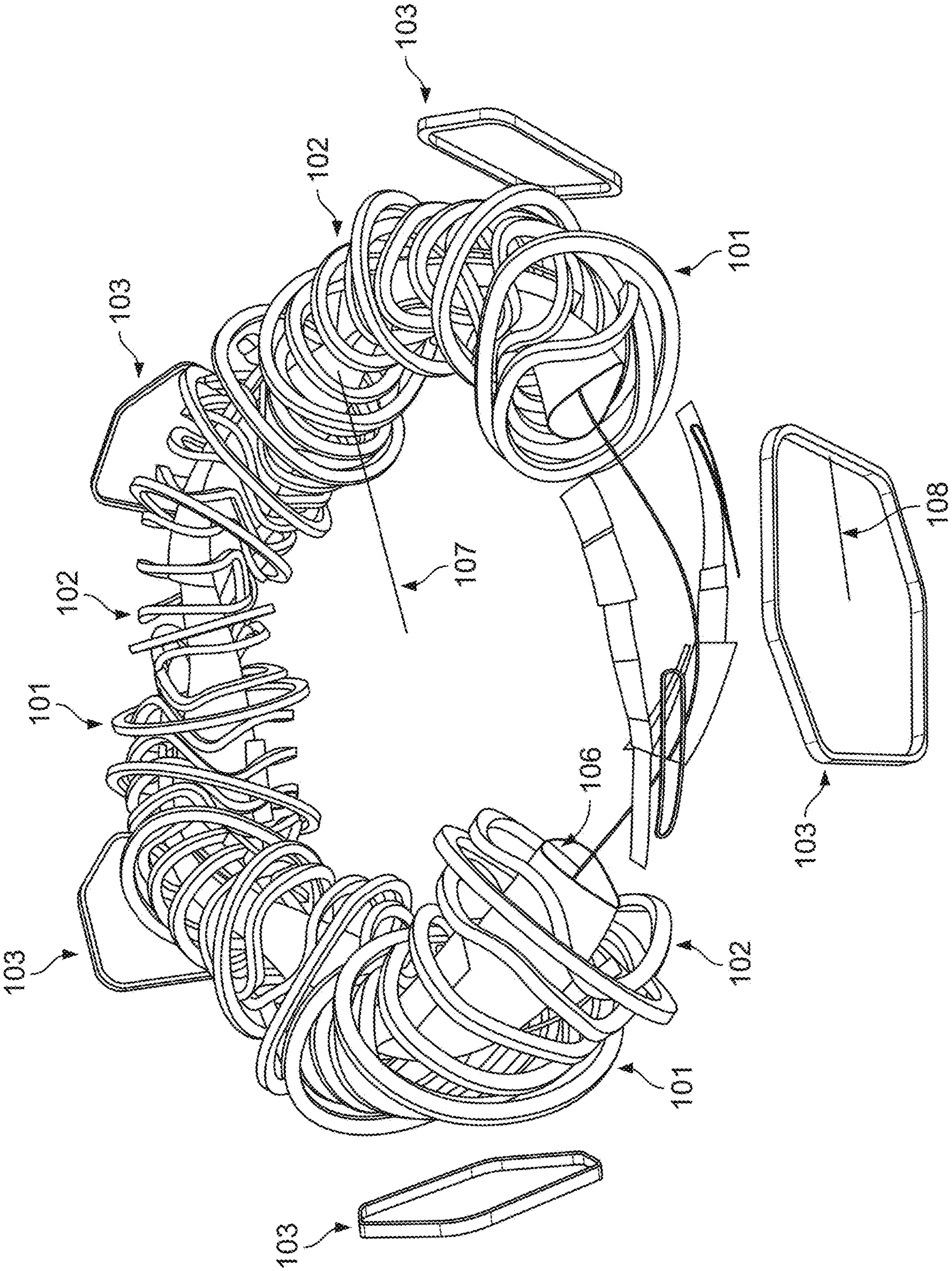
FIG. 1A depicts the components of the Wendelstein 7-X stellarator and, in particular, the arrangement of the external planar coils, modular coils, and planar trim coils in relation to each other and relative to the confined plasma.
Figure 1B:
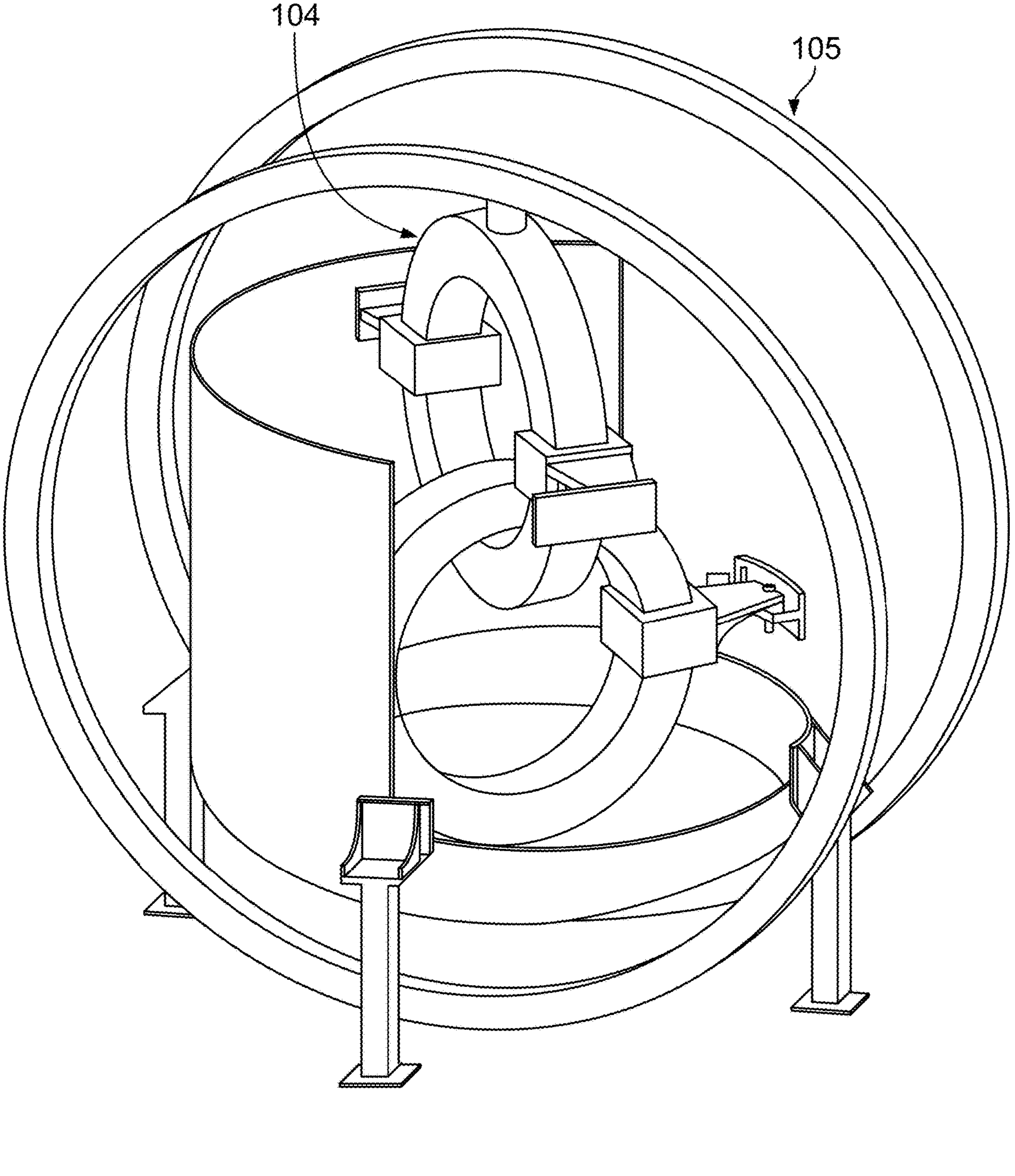
FIG. 1B depicts the components of the CNT stellarator and, in particular, the arrangement of the IL and PF coils.

It should also be understood that, unless clearly indicated to the contrary, in any methods claimed herein that include more than one step or act, the order of the steps or acts of the method is not necessarily limited to the order in which the steps or acts of the method are recited.

As used herein, the singular terms "a," "an," and "the" include plural referents unless context clearly indicates otherwise. Similarly, the word "or" is intended to include "and" unless the context clearly indicates otherwise. The term "includes" is defined inclusively, such that "includes A or B" means including A, B, or A and B.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of" or "exactly one of." "Consisting essentially of," when used in the claims, shall have its ordinary meaning as used in the field of patent law.

The terms "comprising," "including," "having," and the like are used interchangeably and have the same meaning. Similarly, "comprises," "includes," "has," and the like are used interchangeably and have the same meaning. Specifically, each of the terms is defined consistent with the common United States patent law definition of "comprising" and is therefore interpreted to be an open term meaning "at least the following," and is also interpreted not to exclude additional features, limitations, aspects, etc. Thus, for example, "a device having components a, b, and c" means that the device includes at least components a, b, and c. Similarly, the phrase: "a method involving steps a, b, and c" means that the method includes at least steps a, b, and c. Moreover, while the steps and processes may be outlined herein in a particular order, the skilled artisan will recognize that the ordering steps and processes may vary.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Electromagnetic coils may be described according to their shape and/or topology. For instance, an electromagnetic coil may have a planar shape (a coil that lines within one flat plane) or non-planar shape. Planar electromagnetic coils may be fabricated by conventional means and wound with electrical wire under tension. Topology refers to whether an electromagnetic coil links, threads, or interlocks with another coil, in the manner of chain links. Topology may also refer to whether an electromagnetic coil interlocks the plasma or not.

Stellarators

The present disclosure is directed to an improved stellarator design which has a simpler, less complex structure as compared with stellarators developed to-date.

Figure 2A:
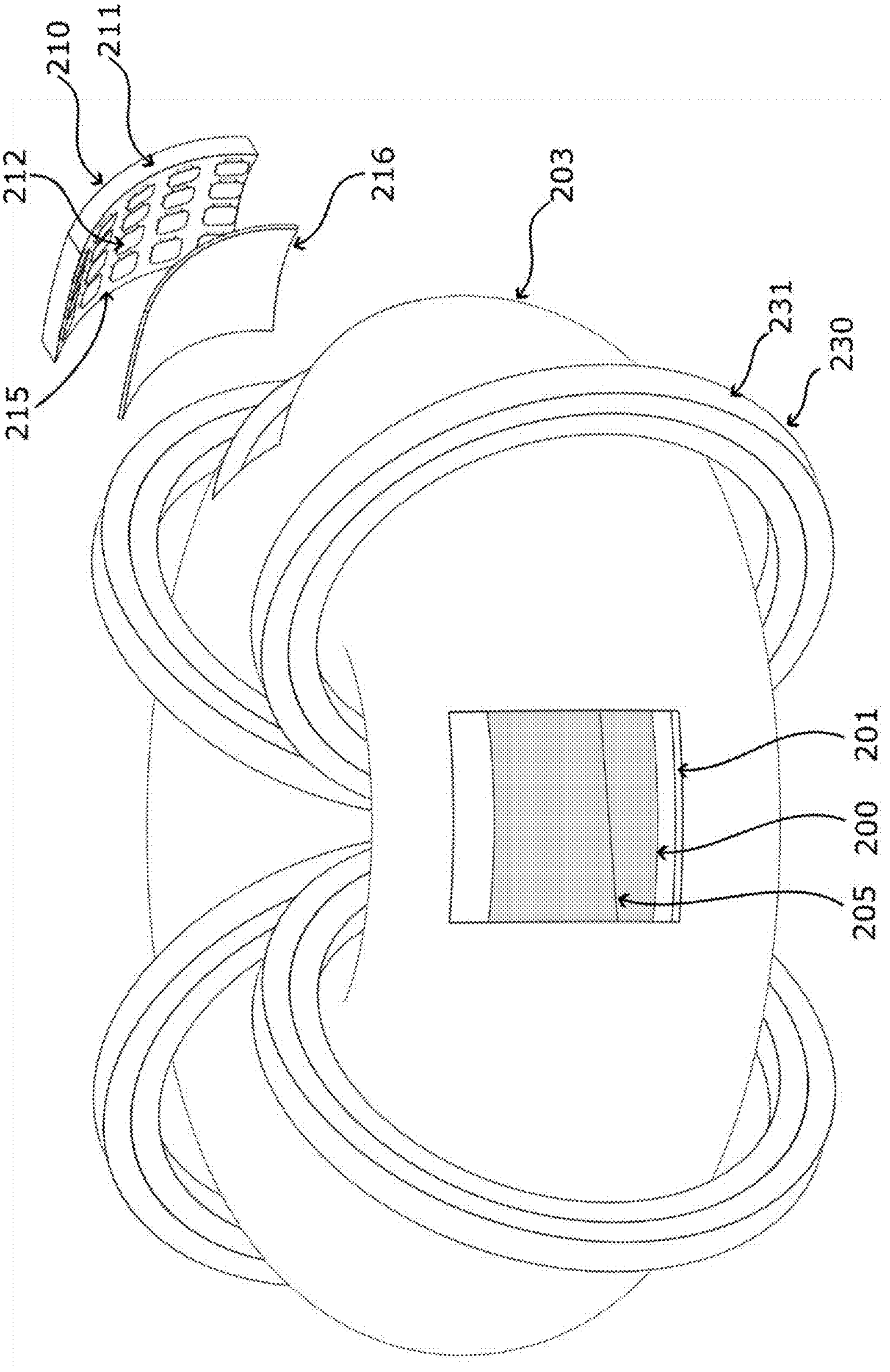
FIG. 2A illustrates a stellarator according in accordance with some embodiments of the present disclosure. In particular.
Figure 2B:
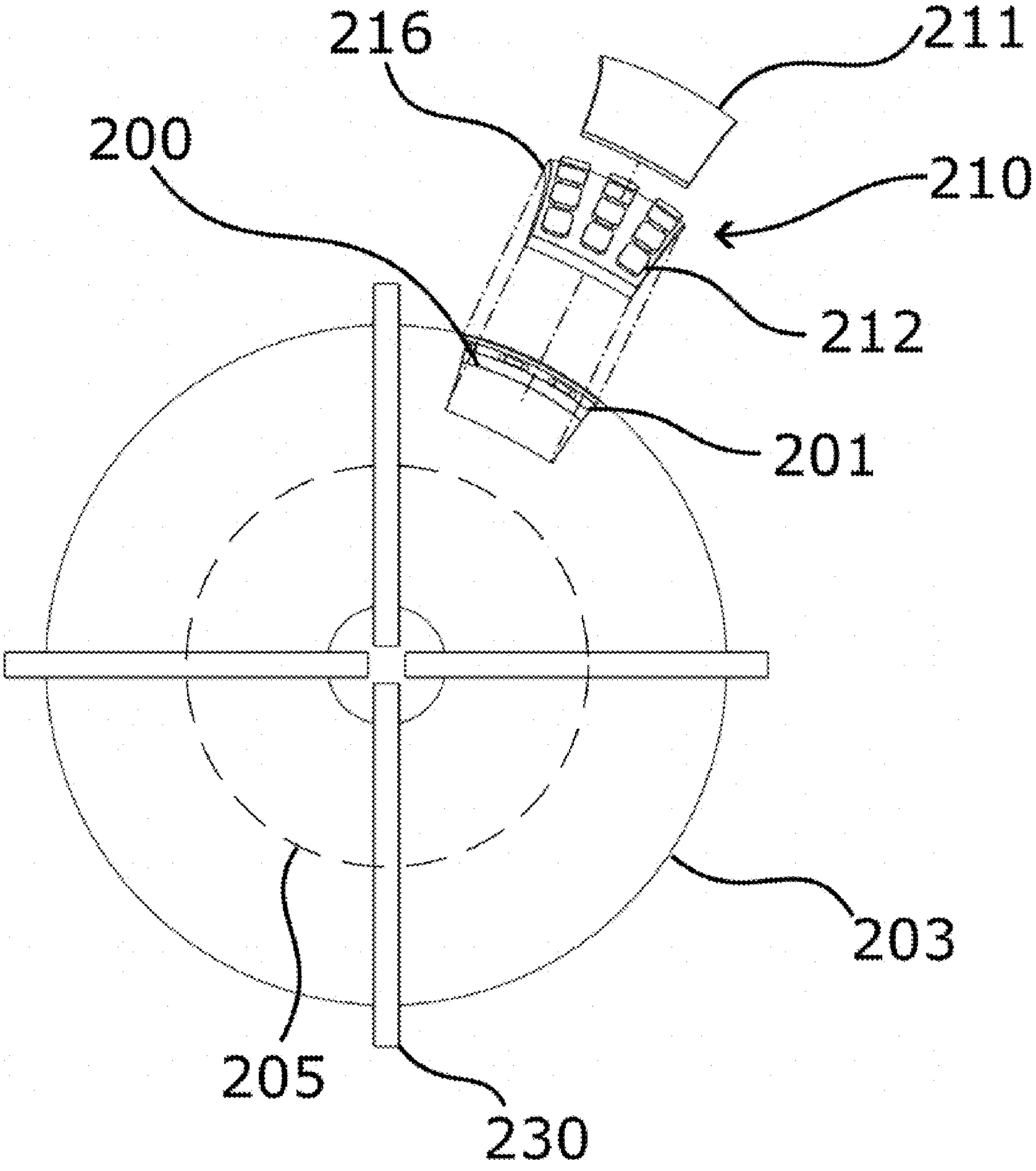
FIG. 2B illustrates a top-down view of a stellarator according in accordance with some embodiments of the present disclosure.
Figure 2C:
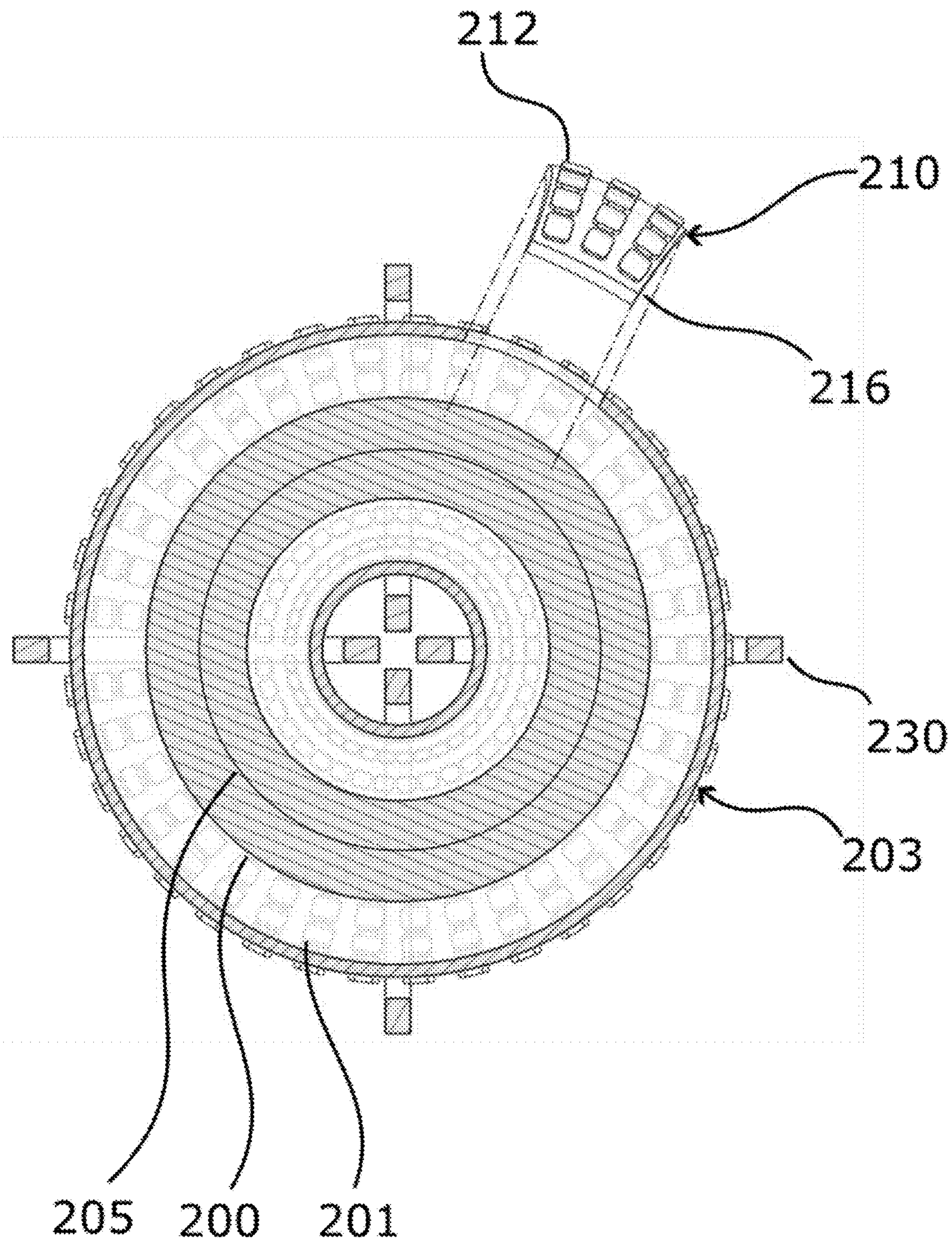
FIG. 2C illustrates a cross sectional view of a stellarator according in accordance with some embodiments of the present disclosure.

Described herein are stellarators incorporating a plurality of encircling coils and a plurality of shaping coils. With reference to FIGS. 2A-2C, stellarators of the present disclosure comprise a field shaping system 203 which surrounds a void 201 that confines a plasma 200. In some embodiments, the void 201 is configured such that a largest dimension from a plasma axis 205 of any contained plasma 200 to an outer edge of the contained plasma (not shown) is less than 20 meters, such as less than 10 meters, such as less than 5 meters, such as less than 4 meters, such as less than 3 meters, such as less than 2 meters, such as less than 1 meter, such as less than 0.5 meters, etc.

In some embodiments, the plasma 200 has a topology which substantially approximates that of a torus. In some embodiments, the plasma 200 is centered around a "plasma axis" 205, which is a magnetic field line that maps onto its own origin after one toroidal rotation. In some embodiments, the plasma axis 205 has a topology of a loop or one that substantially approximates a loop.

The field shaping system 203 comprises a plurality of field shaping units 210. In some embodiments, the field shaping system 203 may comprise at least 2, at least 4, at least 6, at least 8, at least 10, at least 12, at least 16, at least 20, at least 24, at least 30, at least 36, at least 48, at least 54, at least 60, at least 70, at least 80, at least 90, at least 100, at least 110, at least 120, at least 130, at least 150, at least 170 field shaping units 210.

In some embodiments, each of the field shaping units 210 includes one or more structural mounting elements 211 having a surface 215. In some embodiments, the surface 215 of each field shaping unit 211 faces the void 201. In some embodiments, each field shaping unit 210 further includes one or more additional components 216. The one or more additional components include, but are not limited to, a first wall to handle plasma flux, a structure which mounts to the first wall, a breeding blanket to breed radioisotopes from the fusion neutron flux, a cryostat, and/or neutron shielding.

In some embodiments, each field shaping unit 210 comprises a single structural mounting element 211. In other embodiments, each field shaping unit 210 comprises two structural mounting elements 211. In yet other embodiments, each field shaping unit 210 comprises three structural mounting elements 211. In further embodiments, each field shaping unit 210 comprises four or more structural mounting elements 211. In some embodiments, the structural mounting element 211 is comprised of steel. In some embodiments, the structural mounting element 211 comprises a metal. In some embodiments, the structural mounting element 211 comprises a composite material, such as G-10.

Figure 4A:
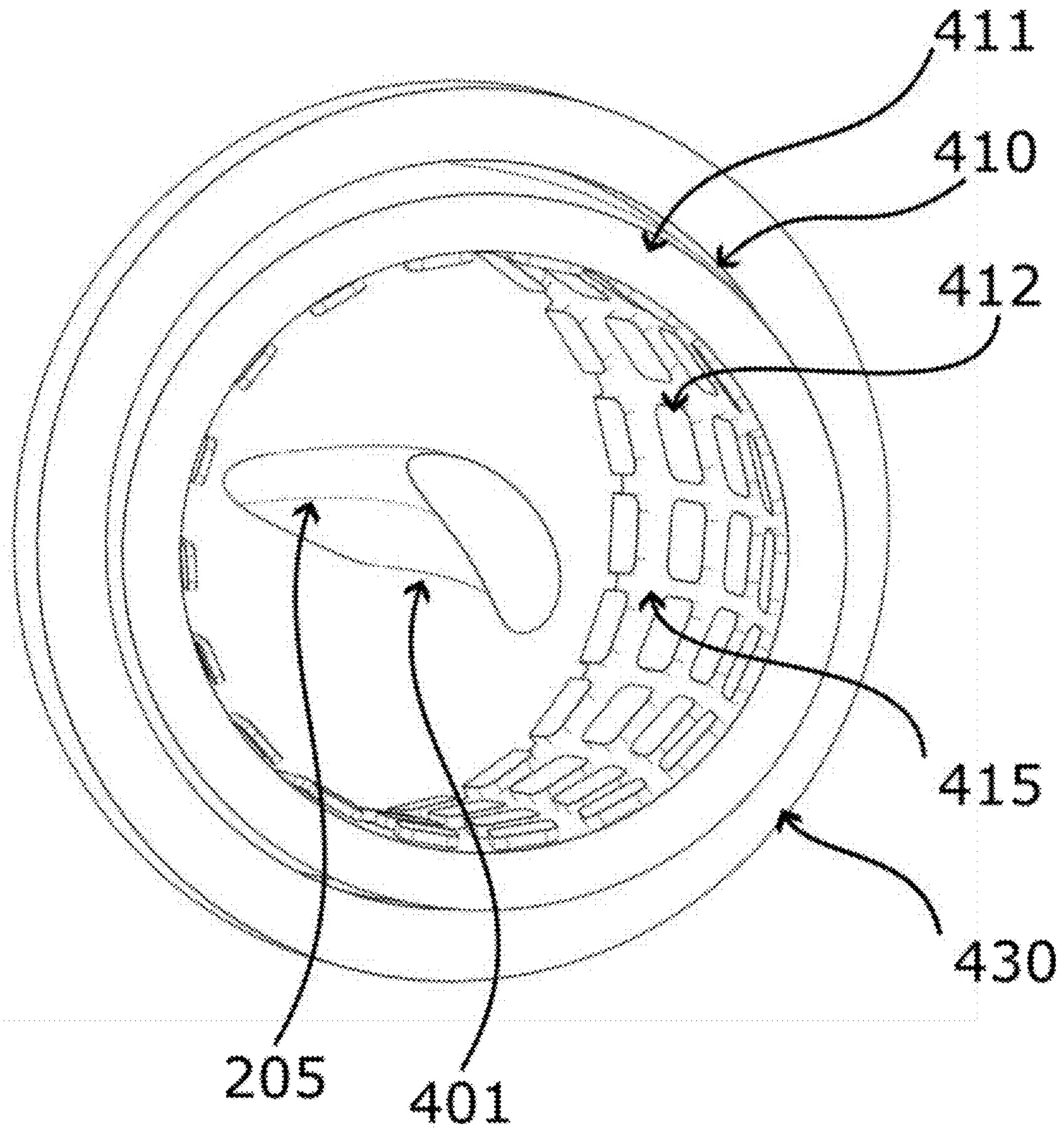
FIG. 4A illustrates a cross sectional view of a stellarator showing a field shaping unit and an encircling coil in accordance with one embodiment of the present disclosure.
Figure 4B:
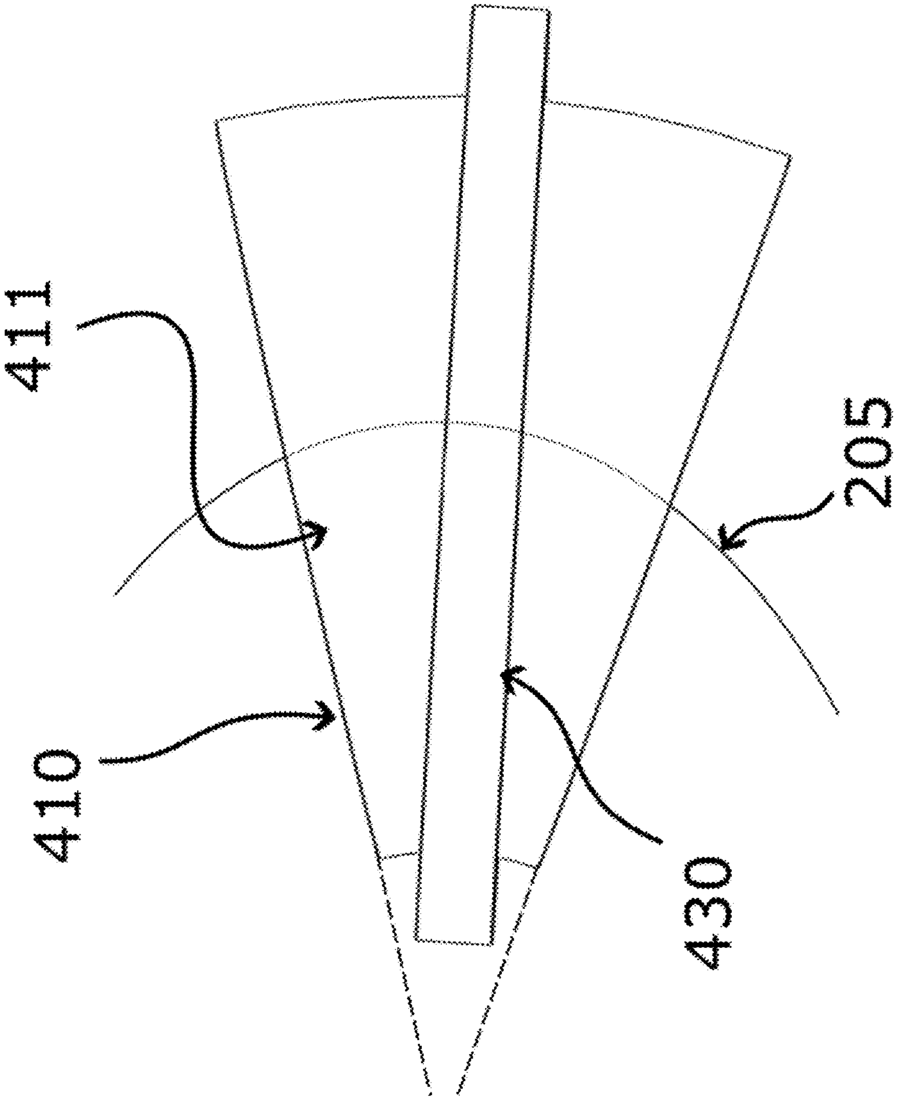
FIG. 4B illustrates a top-down view of a portion of a stellarator showing a field shaping unit having a wedge-like shape as viewed from this angle.

The field shaping unit 210 may have any size and shape. In some embodiments, the field shaping unit 210 defines an extruded circular annulus cross section structure. In other embodiments, the field shaping unit 210 has an arbitrary shape, such as a shape having a non-constant cross section. For example, and as illustrated in FIG. 4B, in some embodiments, the field shaping unit 410 has a wedge shape (as seen from a perspective perpendicular to the plasma axis and the direction of curvature, arranged such that the narrower portion of the wedge faces the direction of plasma axis curvature, and the wider portion of the wedge faces opposite the direction of plasma axis curvature). In some embodiments, the field shaping unit 410 is substantially wedge shaped. In other embodiments, the field shaping unit 210 has a shape similar to or the same as a cross sectional shape of the plasma at that location. In other embodiments, the field shaing unit has about the cross sectional shape of the plasma, with some constant normal offset distance.

In some embodiments, one or more shaping coils 212 are disposed on the surface 215 of each of the one or more structural mounting elements 211. It is believed that the one or more shaping coils 212 of the present disclosure are relatively easy to manufacture, assemble, and integrate into a field shaping unit. Moreover, it is believed that the one or more field shaping coils 212 allow precise control over the shape of the plasma.

Each of the one or more shaping coils 212 are planar coils. A "planar" coil is one whose shape substantially lies within one flat plane. In some embodiments, each of the shaping coils 212 individually do not encircle the plasma axis 205. Said another way, any one shaping coil 212 does not encircle the plasma 200 or the plasma axis 205. For instance, and as depicted in FIGS. 4 and 5, the shaping coils 412 or 512 are disposed on surface 415 or 515 of a structural mounting element 411 or 511, respectively, and each individual shaping coil 412 or 512 does not encircle the plasma axis.

While any individual shaping coil 212 does not encircle the plasma axis 205, collectively an array including a plurality of shaping coils 212 mounted on the surfaces 215 of one or more structural mounting elements 211 would encircle the plasma axis 205. This is illustrated in FIG. 4A which shows a plurality of shaping coils 412 arranged on a surface 415 of a structural mounting element 411. As depicted, no one shaping coil 412 encircles the plasma confined in the void 401. However, the collective of all shaping coils 412 as arranged on the surface 415 of the one or more structural mounting elements 411 does encircle the plasma and/or the void 401. This concept is further illustrated in FIG. 5, which again illustrates that no one shaping coil 512 encircles the plasma confining void 501. In some embodiments, individual shaping coils 512 may be positioned on opposite sides of the plasma or on different faces of the void.

Figure 5:
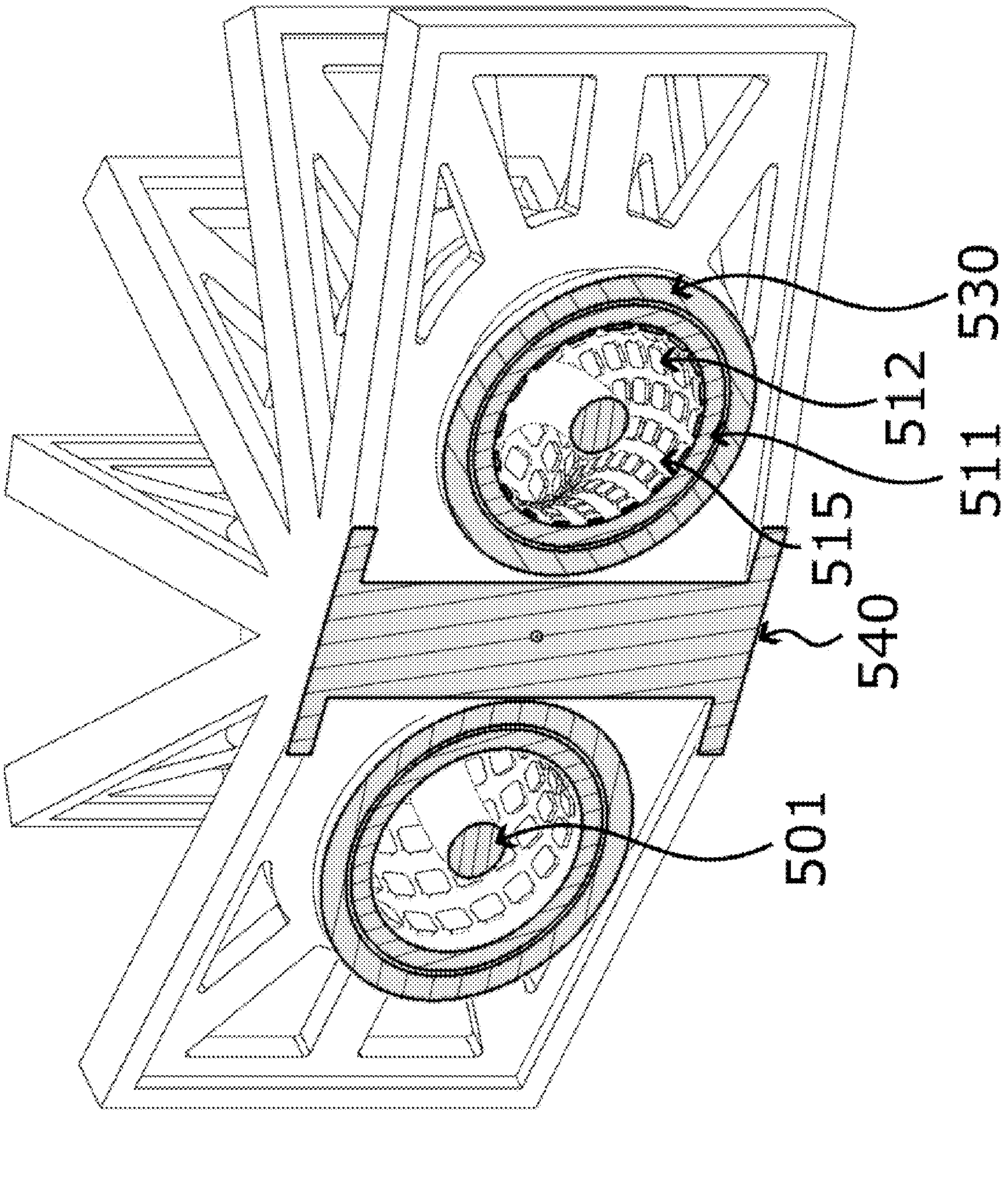
FIG. 5 shows a cross sectional view of a stellarator and, in particular, depicts one or more encircling coils encircling a field shaping system in accordance with one embodiment of the present disclosure.

Each of the one or more shaping coils 212, 412 or 512 do not interlock with any other shaping coil, such as illustrated in at least FIGS. 2A, 4A and 5. Additionally, each of the one or more shaping coils do not interlock with any of the encircling coils 230 described herein (see FIGS. 2A, 4A, and 5). In some embodiments, the one or more shaping coils 212 are removably coupled to the surface 215 of the one or more surface mounting elements 211.

In some embodiments, the planar shaping coils have a mean coil radius which is smaller than a major radius of the plasma and smaller than a minor radius of the plasma. As used herein, the "major radius" of the plasma is the mean distance between the plasma axis and the geometric center of the stellarator. As used herein, the "minor radius" of the plasma is the mean closest distance between each point on the plasma boundary and the plasma axis. The plasma boundary is sometimes represented by a set of toroidal Fourier amplitudes; for this case, the major radius is represented by the amplitude of the mode with toroidal mode number 0 and poloidal mode number 0; and the minor radius is represented by the amplitudes of the mode with toroidal mode number 0 and poloidal mode number 1.

Figure 3A:
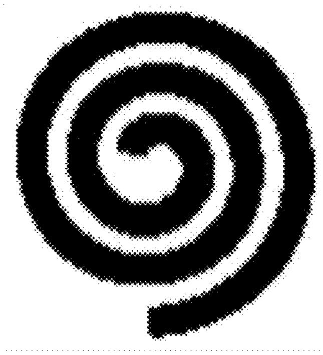
FIG. 3A illustrates a coil design having a circular winding pattern.
Figure 3B:
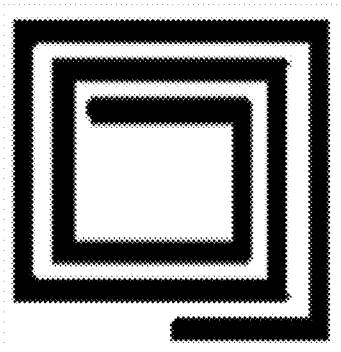
FIG. 3B illustrates a coil design having a rectangular winding pattern.
Figure 3C:
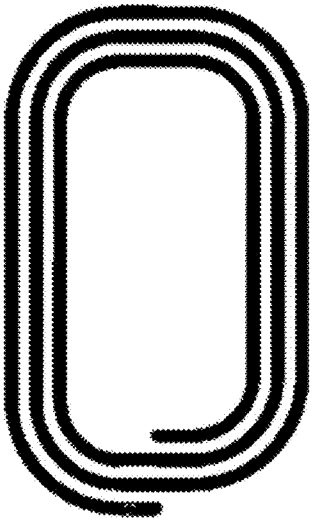
FIG. 3C illustrates a coil design having a rectangular winding pattern, but where the edges are rounded.

The shaping coils 212 may have different sizes and shapes. For instance, and with reference to FIG. 3A, in some embodiments the shaping coils 212 may be circular or substantially circular. In other embodiments, the shaping coils may be rectangular or substantially rectangular (FIG. 3B). In yet other embodiments, the shaping coils may be rectangular with rounded corners or substantially rectangular with rounded corners (FIG. 3C). In some embodiments, each field shaping unit 210 may comprise one or more coils having different shapes. For instance, a field shaping unit 210 may comprise 10 shaping coils where 3 of the shaping coils may have a substantially circular shape, 4 of the shaping coils may have a substantially rectangular shape, and 3 of the coils may have a substantially rectangular shape with rounded corners (not depicted).

In some embodiments, the stellarator of the present disclosure may include between about 10 and 10,000 shaping coils. In other embodiments, the stellarator of the present disclosure may include between about 50 and 5,000 shaping coils. In yet other embodiments, the stellarator of the present disclosure may include between about 100 and 5,000 about shaping coils. In further embodiments, the stellarator of the present disclosure may include between about 100 and 4,000 about shaping coils. In yet further embodiments, the stellarator of the present disclosure may include between about 100 and 3,000 about shaping coils. In even further embodiments, the stellarator of the present disclosure may include between about 100 and 2,000 about shaping coils. In even further embodiments, the stellarator of the present disclosure may include between about 100 and 1,000 about shaping coils.

In some embodiments, a field shaping unit 210 may include between about 5 and about 150 shaping coils 212. In other embodiments, a field shaping unit 210 may include between about 5 and about 100 shaping coils 212. In yet other embodiments, a field shaping unit 210 may include between about 5 and about 80 shaping coils 212. In further embodiments, a field shaping unit 210 may include between about 5 and about 70 shaping coils 212. In even further embodiments, a field shaping unit 210 may include between about 5 and about 60 shaping coils 212. In yet even further embodiments, a field shaping unit 210 may include between about 5 and about 50 shaping coils 212. In yet even further embodiments, a field shaping unit 210 may include between about 5 and about 45 shaping coils 212. In yet even further embodiments, a field shaping unit 210 may include between about 5 and about 40 shaping coils 212. In yet even further embodiments, a field shaping unit 210 may include between about 5 and about 35 shaping coils 212. In yet even further embodiments, a field shaping unit 210 may include between about 5 and about 30 shaping coils 212. In yet even further embodiments, a field shaping unit 210 may include between about 5 and about 25 shaping coils 212.

With reference to FIG. 2, the stellarator of the present disclosure also includes a plurality of encircling coils 230 which encircle the plasma axis 205. Each of the encircling coils 230 are arranged around an exterior of the field shaping system 203 and encircle it. This is further illustrated in FIGS. 4 and 5 which show encircling coils 430 and 530 encircling the plasma and/or void 401 or 501, respectively; but where the encircling coils 430 and 530 are exterior to any field shaping unit 410 or 510.

Each encircling coil 230 of the plurality of encircling coils are planar. Moreover, each encircling coil 230 of the plurality of encircling coils are non-interlocking with any other encircling coil 230. Additionally, each encircling coil 230 of the plurality of encircling coils are do not interlock with any of the shaping coils 212. Said another way, any encircling coil 230 does not interlock with any other planar encircling coil 230 or with any other shaping coil 212, such as depicted in FIGS. 2A, 2B, and 5. In some embodiments, each encircling coil 230 is supported by a structural component 231. In some embodiments, the structural component 231 and the field shaping units 210 may be coupled to other structural members 540 which react to unbalanced forces and torques.

In some embodiments, the encircling coils do not exhibit the N-fold rotational symmetry of toroidal field (TF) coils. If the encircling coils are N-fold rotationally symmetric, like TF coils in the prior art, then the planar shaping coils require some irreducible quantity of current length (Amperes*meters) in order to correct this field. If the encircling coils are allowed to not be N-fold rotationally symmetric, the current-length requirements of the planar shaping coils can be reduced by a large factor. It is believed that this requirement may be reduced by nearly a factor of 10 by allowing the encircling coils to be positioned more favorably.

In some embodiments, the stellarators of the present disclosure include between about 3 and about 150 encircling coils. In other embodiments, the stellarators of the present disclosure include between about 3 and about 100 encircling coils. In yet other embodiments, the stellarators of the present disclosure include between about 3 and about 75 encircling coils. In further embodiments, the stellarators of the present disclosure include between about 3 and about 50 encircling coils. In yet further embodiments, the stellarators of the present disclosure include between about 3 and about 25 encircling coils. In even further embodiments, the stellarators of the present disclosure include between about 3 and about 15 encircling coils. In yet even further embodiments, the stellarators of the present disclosure include between about 3 and about 10 encircling coils. In some embodiments, the spacing between each encircling coil may range from between about 10 cm to about 1 m.

The shaping coils 212 and the encircling coils 230 may be comprised of one or more superconducting materials. A superconductor is a material that achieves superconductivity. Superconductivity is the property of certain materials to conduct direct current (DC) electricity without energy loss when they are cooled below a critical temperature (referred to as Tc). An electric current in a superconductor can persist indefinitely. Exemplary superconducting materials include, but are not limited to, Nb—Ti, $Nb_3Sn$, $MgB_2$, $LaBaCuO_x$, LSCO (e.g., $La_{2-x}Sr_xCuO_4$, etc.), YBCO (e.g., $YBa_2Cu_3O_x$, or $YBa_2Cu_3O_7$), REBCO, bismuth-based cuprate superconductors (BSCCO) (including $BiSr_2CaCu_2O_8$ (Bi-2212) and $Bi_2Sr_2Ca_2Cu_3O_{10}$ (Bi-2223)). TBCCO (e.g., $Tl_2Ba_2Ca_2Cu_3O_{10}$ or $Tl_mBa_2Ca_{n-1}Cu_nO_{2n+m+2+\delta}$), $HgBa_2Ca_2Cu_3O_x$, and other mixed-valence copper-oxide perovskite materials. In some embodiments, the shaping coils and the encircling coils may be comprised on the same materials. In other embodiments, the shaping coils and the encircling coils may be comprised on different materials.

Figure 2D:
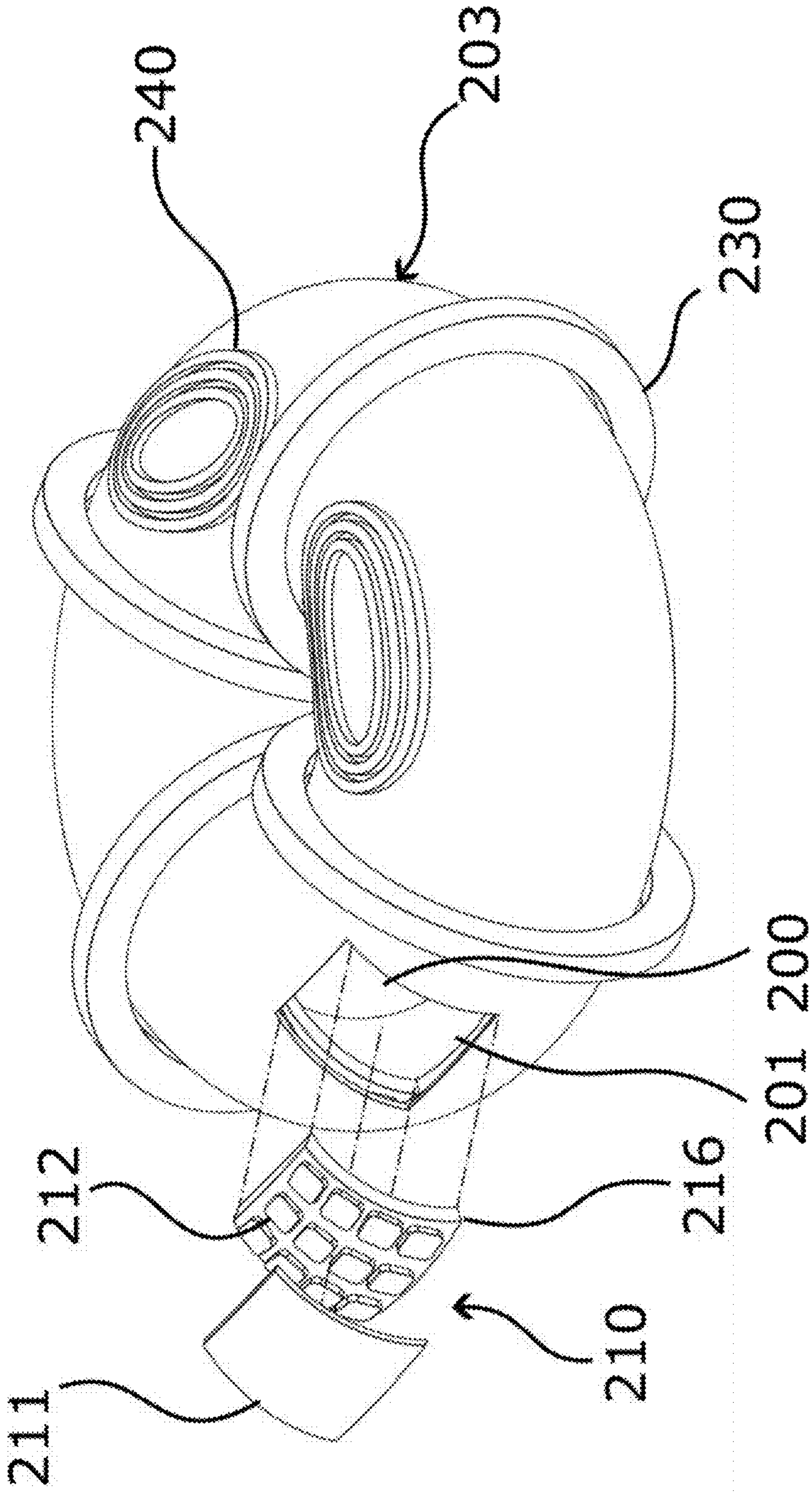
FIG. 2D illustrates a top-down view of a stellarator according in accordance with some embodiments of the present disclosure, where the stellarator is depicted as including one or more optional saddle coils.
Figure 2E:
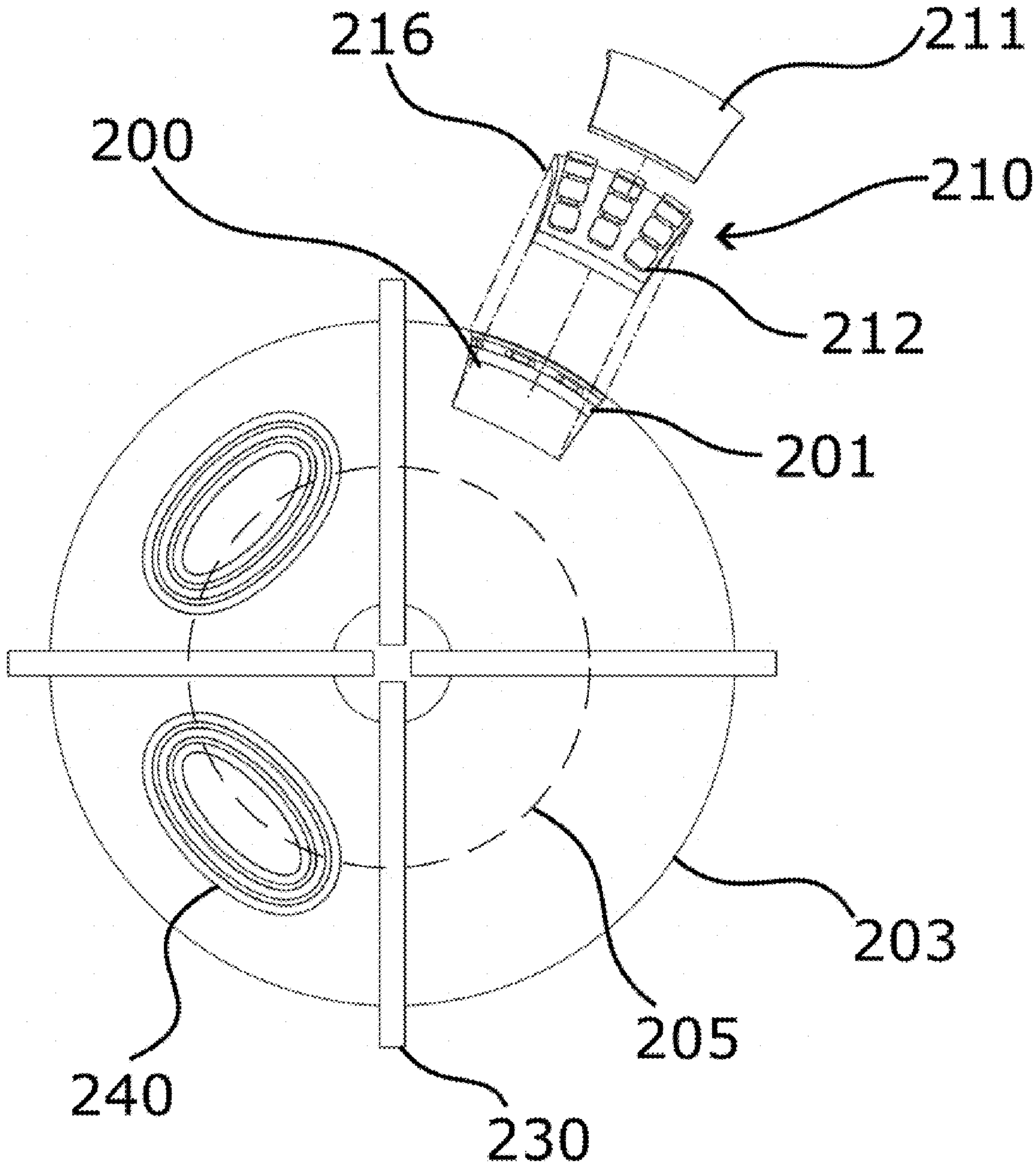
FIG. 2E illustrates a cross sectional view of a stellarator according in accordance with some embodiments of the present disclosure, where the stellarator is depicted as including one or more optional saddle coils.

With reference to FIGS. 2D and 2E, in some embodiments, the stellarators of the present disclosure further include one or more additional coils 240, such as one or more control coils and/or one or more saddle coils. In some embodiments, the control coils and/or the saddles are planar. In some embodiments, the control coils and/or the saddles are non-planar. In some embodiments, the control coils and/or the saddles are superconducting. In some embodiments, the control coils and/or the saddles are non-interlocking and, in particular, they do not interlock any other of the disclosed coils (e.g., encircling coils, shaping coils) or the plasma axis. In some embodiments, the control coils and/or the saddle coils are disposed between the plasma boundary and the field shaping system. In some embodiments, the control coils and/or the saddle coils are disposed outward of the field shaping system, on the non-plasma-axis-facing side. Control coils are coils included as a contingency against unexpected sources of error. These errors may arise from errors in assembly of the magnet system, or from unexpected plasma physics. Before the error is measured, the correct electrical current for the control coils is not known. During normal operation of the stellarator, if the stellarator and plasma are operating at their design points, the control currents have zero electric current. The design of the stellarator magnetic field does not include contributions from the control coils.

In some embodiments, the stellarator is communicatively coupled to one or more controllers. In some embodiments, the one or more controllers are configured to control each of the one or more field-shaping units and optionally the one or more encircling coils. In some embodiments, one or more controllers are adapted to control a subset of the shaping coils disposed on a surface of a field shaping unit. In some embodiments, one or more controllers may be adapted to control one or more of the optional control coils and/or the optional saddle coils. In some embodiments, the one or more controllers include one or more power supplies which may be configured to increase or decrease the electrical current flowing in a subset of the encircling coils and/or the shaping coils. In some embodiments, the one or more controllers include a switching system which may be configured to connect one or more power supplies to certain subsets of encircling coils and/or shaping coils.

Embodiments of the subject matter and the operations described in this disclosure may be implemented in digital electronic circuitry, or in computer software, firmware, or hardware, including the structures disclosed in this specification and their structural equivalents, or in combinations of one or more of them. Embodiments of the subject matter described in this disclosure may be implemented as one or more computer programs, i.e., one or more modules of computer program instructions, encoded on computer storage medium for execution by, or to control the operation of, data processing apparatus.

In some embodiments, the controller includes a processor and a non-transitory computer readable storage medium operably coupled to the processor. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or can be included in, one or more separate physical components or media (e.g., multiple CDs, disks, or other storage devices). The operations described in this disclosure may be implemented as operations performed by a data processing apparatus on data stored on one or more computer-readable storage devices or received from other sources. In some embodiments, the non-transitory computer readable storage medium contains instructions that, when executed by the processor, cause the processor to adjust a strength of a field generated by one or more coils in order to contain plasma within the magnetic fields.

Methods of Designing a Stellarator

Figure 6:
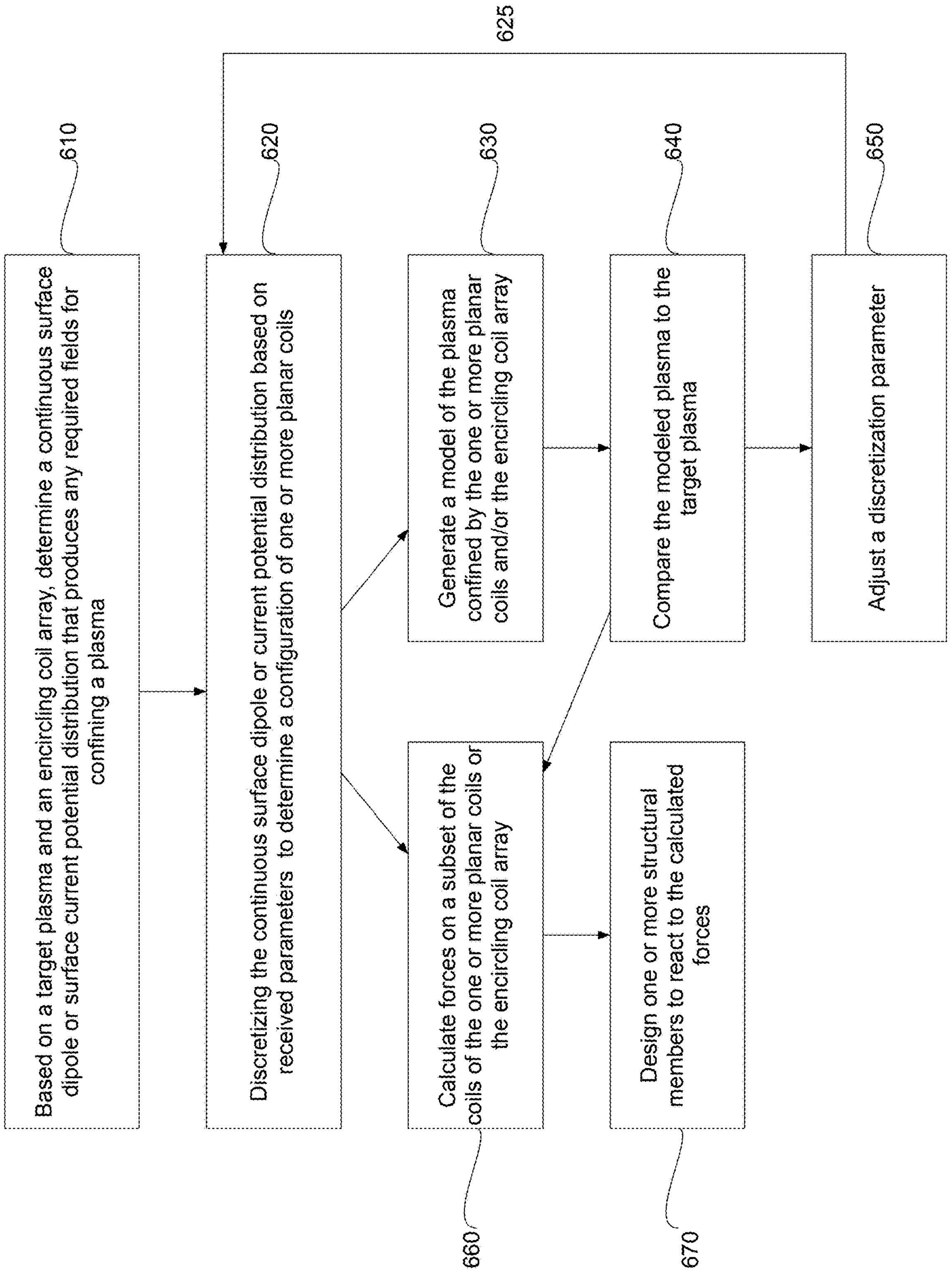
FIG. 6 provides a flowchart illustrating a method of designing a set of shaping coils by discretizing a surface dipole or current potential distribution in accordance with one embodiment of the present disclosure.

In some embodiments, a method is provided for designing a stellarator using shaping and encircling coils. As seen in FIG. 6, the method 600 may include determining 610 a continuous surface dipole or surface current potential distribution that produces any required fields for confining a plasma using a surface current, given an optimized plasma target and an encircling coil array as in Merkel 1987 (Merkel, P. 1987. Nuclear Fusion 27 (5): 867) or Landreman 2017 (Landreman, Matt. 2017. Nuclear Fusion 57 (4): 046003). The method may also include receiving parameters and then defining 620 a configuration of shaping coils by discretizing the continuous surface dipole or current potential distribution. Non-limiting examples of parameters that may be received are the resolution of the surface to be discretized into coils, a cutoff current below which a coil is removed from the design, and/or the maximum coil linear dimension. The method may also include modeling 630, e.g., via a simulation, a reconstructed plasma, and comparing 640 properties of the reconstructed model plasma to the optimized plasma target. In some embodiments, the reconstructed model plasma is modeled using a free-boundary plasma solver.

In some embodiments, the method may include optimizing the target plasma properties and magnetic field coil requirements via an iterative process. After the comparing step 640, the method may include adjusting 650 a parameter used to define (determine) the configuration of shaping coils, then repeating 625 the steps of defining 620, generating 630, and comparing 640, until an acceptable comparison is achieved. The iteratively defining the configuration of shaping coils, generating the reconstructed model plasma, comparing properties, and adjusting a parameter used to define the configuration of shaping coils.

After the comparing step 640, the method may include defining 660 forces on a subset of the coils, such as any of the encircling coils and/or any of the shaping coils or any subset thereof. Once the force on a subset of the coils has been defined, the method may also include designing 670 one or more structural members 540 and/or structural components 231 to react to the forces on a subset of the coils.

All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications, and publications to provide yet further embodiments.

Although the present disclosure has been described with reference to a number of illustrative embodiments, it should be understood that numerous other modifications and embodiments can be devised by those skilled in the art that will fall within the spirit and scope of the principles of this disclosure. More particularly, reasonable variations and modifications are possible in the component parts and/or arrangements of the subject combination arrangement within the scope of the foregoing disclosure, the drawings, and the appended claims without departing from the spirit of the disclosure. In addition to variations and modifications in the component parts and/or arrangements, alternative uses will also be apparent to those skilled in the art.

The invention claimed is:

1. A method for designing a stellarator including one or more planar coils and an array of encircling coils, comprising:

(a) obtaining for the stellarator (i) a target plasma, and (ii) a configuration of the array of encircling coils;

(b) using a surface current or a surface current potential, determining a continuous surface dipole distribution that produces one or more magnetic fields for confining the target plasma (c) receiving one or more parameters selected from a resolution of the surface to be discretized into coils, a cutoff current, and/or a maximum coil linear dimension; and (b) based on the received one or more parameters, defining a configuration of the one or more planar coils by discretizing the determined continuous surface dipole distribution.

2. The method of claim 1, further comprising generating a model of the plasma confined by the configuration of the one or more planar coils and the array of encircling coils.

3. The method of claim 2, wherein the generating of the model of the plasma comprises using a free-boundary plasma solver.

4. The method of claim 1, further comprising optimizing the target plasma by iteratively defining the configuration of the one or more planar coils.

5. The method of claim 1, further comprising defining forces on the one or more planar coils.

6. The method of claim 5, further comprising designing mechanical supports to react to the forces on the one or more planar coils.

* * * * *